United States Patent
Wong et al.

(10) Patent No.: US 10,803,065 B1
(45) Date of Patent: Oct. 13, 2020

(54) MICROCUBES

(71) Applicant: BUSINESS OBJECTS SOFTWARE LTD., Dublin (IE)

(72) Inventors: Justin Wong, Burnaby (CA); Houman Ghaemi, Vancouver (CA); Veljko Jovanovic, Vancouver (CA)

(73) Assignee: BUSINESS OBJECTS SOFTWARE LTD, Dublin (IE)

( * ) Notice: Subject to any disclaimer, the term of this patent is extended or adjusted under 35 U.S.C. 154(b) by 0 days.

(21) Appl. No.: 16/569,091

(22) Filed: Sep. 12, 2019

(51) Int. Cl.
G06F 16/2455 (2019.01)
G06F 16/2458 (2019.01)
G06F 16/28 (2019.01)

(52) U.S. Cl.
CPC .... G06F 16/24566 (2019.01); G06F 16/2458 (2019.01); G06F 16/285 (2019.01)

(58) Field of Classification Search
CPC .............. G06F 16/2458; G06F 16/285; G06F 16/24578; G06F 16/24561; G06F 16/24556; G06F 16/24566
See application file for complete search history.

(56) References Cited

U.S. PATENT DOCUMENTS

| | | | |
|---|---|---|---|
| 6,578,032 B1* | 6/2003 | Chandrasekar | G06F 16/30 |
| 9,342,626 B1* | 5/2016 | Das | G06F 16/90324 |
| 10,037,357 B1* | 7/2018 | Donaker | G06F 16/2457 |
| 2014/0149415 A1* | 5/2014 | Haahr | G06F 16/3326 |
| | | | 707/737 |
| 2014/0280112 A1* | 9/2014 | Cheng | G06Q 30/00 |
| | | | 707/728 |
| 2015/0186535 A1* | 7/2015 | Patil | G06F 3/04817 |
| | | | 707/710 |
| 2017/0132277 A1* | 5/2017 | Hsiao | G06F 3/0482 |
| 2017/0139891 A1* | 5/2017 | Ah-Soon | G06Q 10/063 |
| 2017/0161373 A1* | 6/2017 | Goyal | G06F 16/9035 |
| 2019/0163783 A1* | 5/2019 | Abrashkevich | G06F 16/244 |

OTHER PUBLICATIONS

Chen, Hansen, Optimize query with Query Stripping in Web intelligence, Jun. 3, 2013, SAP Community Wiki, pp. 1, 3, <https://wiki.scn.sap.com/wiki/display/BOBJ/Optinnize+query+with+Query+Stripping+in+Web+Intelligence> (Year: 2013).*

* cited by examiner

*Primary Examiner* — James Trujillo
*Assistant Examiner* — Michal Bogacki
(74) *Attorney, Agent, or Firm* — Buckley, Maschoff & Talwalkar LLC (57) ABSTRACT

A system includes determination of a plurality of queries, each of the plurality of queries indicating a first object as a data source, generation of a first query on the first object based on a first two or more of the plurality of queries, modification of each of the first two or more queries to indicate the first query as the data source, requesting of execution of the first query and the modified first two or more queries, and reception of a result set associated with each of the first two or more queries.

18 Claims, 9 Drawing Sheets

MICROCUBES

BACKGROUND

Enterprise software systems receive, generate, and store data related to many aspects of an enterprise. Users operate reporting tools to access such data and display the data in useful formats, such as in graphic visualizations. Specifically, a reporting tool may submit a query to a remote data source to fetch data therefrom.

In one example, a reporting tool fetches a definition of a dashboard including a set of visualizations from a remote data source. The reporting tool builds queries based on the definitions to retrieve data for populating the visualizations, issues the queries to the remote data source, receives query results, and renders the visualizations based on the definitions and the query results. The queries may specify, dimensions, measures and/or filters of a data model, or schema, which characterizes the stored data of the data source.

Even if the built queries are issued to the remote data source in a single batch, the remote data source processes each query separately and generates a separate set of query results for each query. Such operation may result in significant processing redundancy, particularly for queries which specify similar sets of dimensions, measures and/or filters. Efficient systems for acquiring query results based on multiple queries are desired.

DETAILED DESCRIPTION

The following description is provided to enable any person in the art to make and use the described embodiments. Various modifications, however, will remain readily apparent to those in the art.

Generally, some embodiments provide a system to optimize a batch of two or more database queries. According to some embodiments, a query (i.e., a microcube) is defined based on at least two queries of the batch of queries and the at least two queries are modified to indicate the microcube as their respective data source. The microcube is executed by a query server to acquire an intermediate result set and the at least two queries are then executed on the intermediate result set. Depending upon the dimension, measures and filters of the at least two queries and the underlying data, the foregoing may provide more efficient query execution than otherwise.

Some embodiments utilize a clustering algorithm and scoring function to determine whether to group two or more queries into a microcube. The clustering algorithm and scoring function are designed so that the execution of a resulting microcube and associated modified queries is more efficient than execution of the corresponding unmodified queries.

Embodiments may be beneficial in scenarios in which execution of two or more known queries is needed. In one example scenario, a user changes a global filter on a set of several visualizations, each of which is associated with one or more queries. In another example, a user requests a data refresh of such a set of visualizations.

Figure 1:
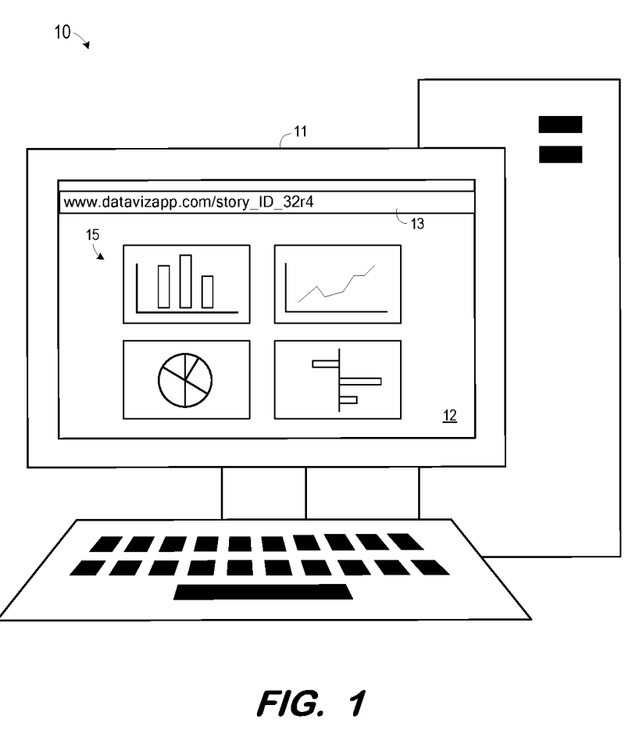
FIG. 1 is a view of a user interface presenting several data visualizations according to some embodiments.

FIG. 1 illustrates system 10 according to some embodiments. System 10 may comprise any client computing system executing a client application. System 10 is not limited to a desktop computer, and may comprise a smartphone, a laptop computer, a tablet computer, etc.

According to some embodiments, system 10 executes a Web browser to present user interface 12 to a user on display 11. The user enters a URL associated with a set of visualizations into address bar 13 (e.g., by directly typing, copy-and-pasting, or selecting a provided link), and system 10 forwards a corresponding request to over the Web. The request is received by a corresponding Web server and a sequence of responses and requests ensues which results in presentation of data visualizations 15 on display 11.

As described above, each of visualizations 15 may be associated with at least one query. Each query specifies a data source, dimensions, measures and/or filters of a data model of the data source. Each query is fired to and executed by a backend data server to acquire the data for its associated visualization.

Figure 2:
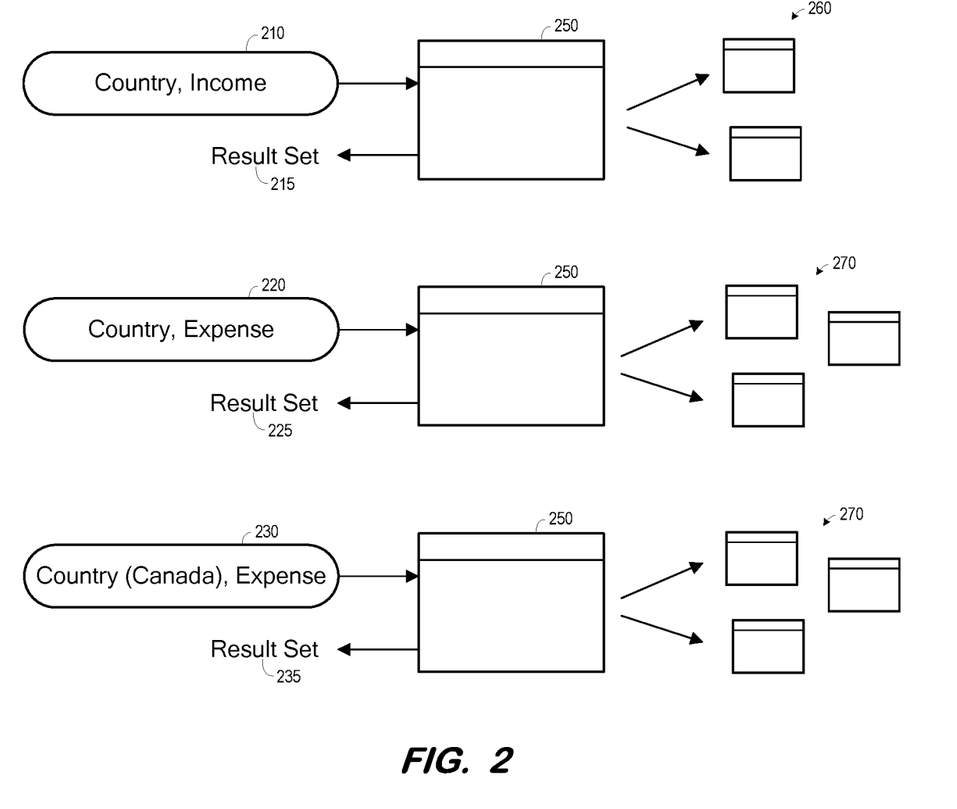
FIG. 2 illustrates execution of multiple queries.

FIG. 2 illustrates queries 210, 220 and 230, each of which may be associated with a respective visualization of a set of visualizations. Embodiments are not limited to use in conjunction with a set of data visualizations and a data visualization application. As will be evident from the foregoing description, embodiments may be employed in any scenario in which multiple queries are ready for execution.

According to the FIG. 2 example, each of queries 210, 220 and 230 specifies data source 250. Data source 250 may comprise a view, which is a SELECT statement that is stored as a database object. A view specifies one or more underlying base tables whose data is physically stored in the database. A view can be queried as if it is a database table, as in SELECT*FROM <view_name>. To execute such a query, the view may fetch data from one or more of the base tables in order to materialize the view into an internal table which exists only during query execution. The SELECT statement of the query is then executed on the view.

FIG. 2 illustrates conventional execution of queries 210 through 230. For example, query 210 selects the Country dimension and Income measure from view 250. In order to execute the SELECT statement, it will be assumed that view 250 is materialized using tables 260 and performs any aggregations needed to generate result set 215.

Query 220 selects the Country dimension and Expense measure from view 250. In order to execute this SELECT statement, view 250 is materialized using tables 270 and performs any aggregations needed to generate result set 225. Query 230 selects the Expense measure and includes a filter Canada on the Country dimension. Execution of query 230 includes materialization of view 250 using tables 270, performance of any needed aggregations, and filtering on Canada to generate result set 235.

Figure 3:
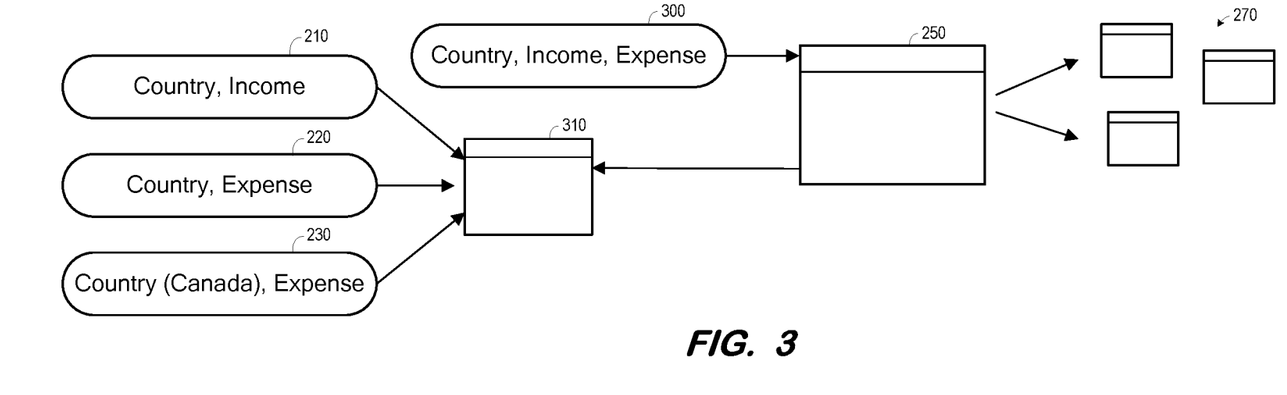
FIG. 3 illustrates execution of multiple queries using a microcube according to some embodiments.

FIG. 3 illustrates generation and use of a microcube based on queries 210 through 230 according to some embodiments. As shown and will be described in detail below, microcube 300 has been generated based on the dimensions, measures and filters of queries 210 through 230. Microcube is a query on view 250 and specifies dimension Country and measures Income and Expense. Queries 210 through 230 have been modified to specify microcube 300 as their respective data source. Accordingly, queries 210 through 230 select from result set 310 of microcube 300. Result set 310 may comprise an intermediate table which exists only during execution of queries 210 through 230.

Figure 4A:
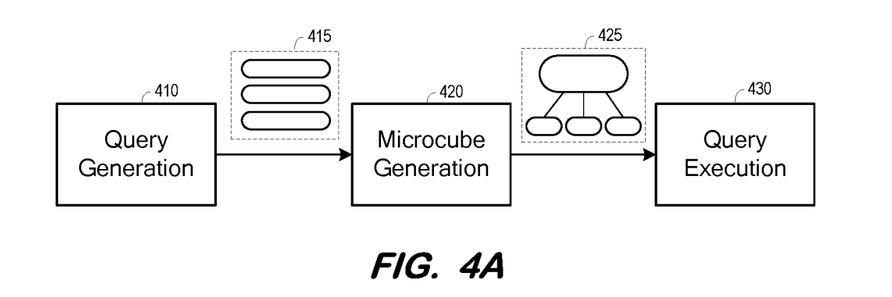
FIG. 4A illustrates microcube generation according to some embodiments.
Figure 4B:
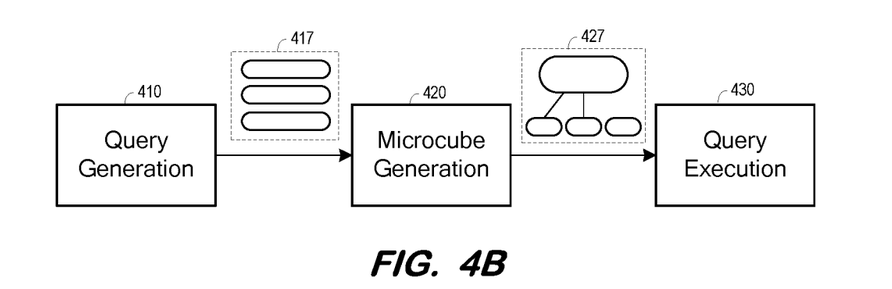
FIG. 4B illustrates microcube generation according to some embodiments.
Figure 4C:
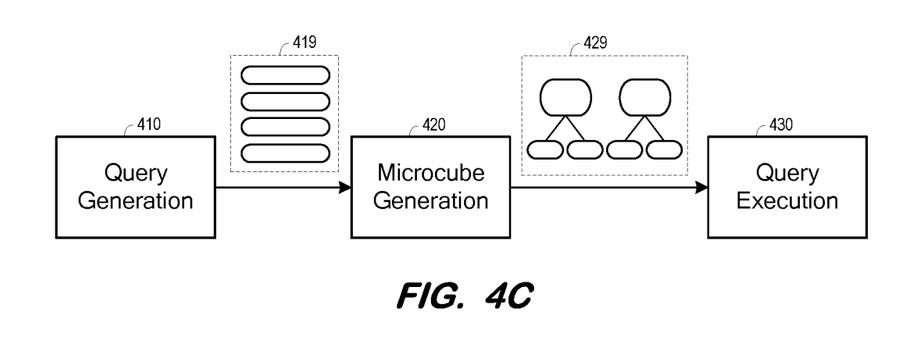
FIG. 4C illustrates microcube generation according to some embodiments.

FIGS. 4A though 4C illustrate several non-exhaustive examples of microcube generation according to some embodiments. FIGS. 4A through 4C each illustrate query generation component 410, microcube generation component 420 and query execution component 430. Each of components 410 through 430 may be implemented by any one or more computing systems consisting of hardware and software configuration that is or becomes known.

According to some embodiments, query generation component 410 comprises a client application executed on a client computing system. For example, query generation component 410 may comprise a JavaScript application executing in an execution engine of a Web browser to provide a data visualization tool such as that illustrated in FIG. 1. During execution of such a tool, query generation component 410 may generate three queries 415 for execution by query execution component 430.

Query execution component 430 may comprise a query server of a remote (e.g., on-premise or cloud-based) data server. The query server may operate in conjunction with a server application which communicates with the above-mentioned client application as is known in the art.

Microcube generation component 420 may comprise a component of query generation component 410, of query execution component 430, or of neither. Specifically, microcube generation component 420 may be executed to generate microcube and modified queries 425 based on queries 415 before sending microcube and modified queries 425 from a client device to query execution component 430 of a remote data server. In another example, such a remote data server receives queries 415 from a client device and executes microcube generation component 420 to generate microcube and modified queries 425 before executing microcube and modified queries 425 as described herein. Microcube generation component 420 may alternatively be executed by a service to which a client device transmits queries 415 and which generates microcube and modified queries 425 for transmission to a remote data server executing query execution component 430.

Queries 415 may comprise a set of queries as described with respect to queries 210 through 230. According to FIG. 4A and as depicted in FIG. 2, microcube generation component 420 generates a single microcube based on queries 415 and modifies each of queries 415 to specify the microcube as its data source. In FIG. 4B, microcube generation component 420 generates a single microcube 427 based on two of queries 417. The two queries are modified to point to the microcube, while the third query remains unchanged.

FIG. 4C shows the generation of two microcubes 429 based on four queries 419. Each of the generated microcubes is associated with two of the four queries, but embodiments are not limited thereto. It should be understood that zero or more microcubes may be generated based on a set of two or more queries, and that any generated microcube may be associated with two or more queries which are modified to point to their respective microcube.

Figure 5:
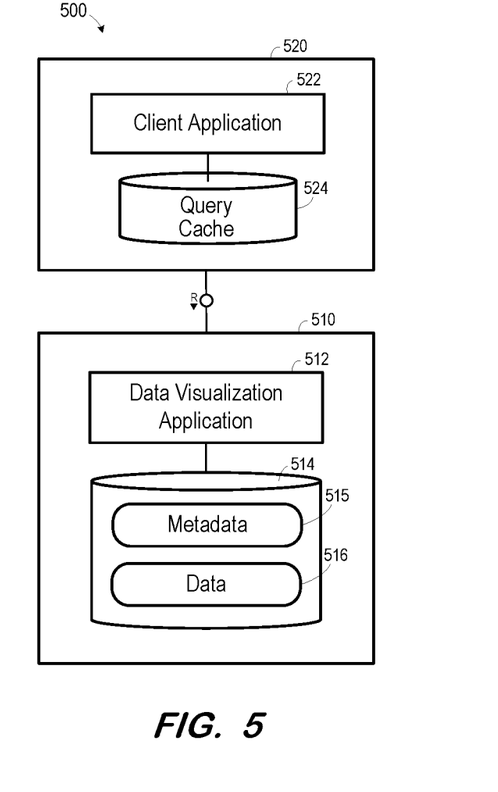
FIG. 5 is a block diagram of a system according to some embodiments.

FIG. 5 is a block diagram of client-server architecture 500 supporting microcubes according to some embodiments. Embodiments are not limited to the FIG. 5 system. Architecture 500 includes data server 510 and client device 520. Generally, data visualization application 512 receives queries from client application 522 and provides results to client application 522 based on those queries. Data server 510 may simultaneously serve many client devices according to some embodiments.

In one specific example, client application 522 is executed to present a user interface to a user. The user manipulates the user interface to generate several queries. The queries are cached in query cache 524 until client application 522 determines to fire the queries to server 510. Prior to firing the queries, client application 522 determines one or microcubes based on the queries and modifies some or all of the queries to point to one of the generated microcubes. Client application 522 then transmits the microcubes, the modified queries and any unmodified queries to data server 510 for execution.

Data store 514 includes metadata 515 defining dimensions and measures, as well as data 516 including dimension members and measure values. Metadata 515 associates each measure and dimension with one or more physical entities (e.g., a physical database table, associated columns of one or more database tables).

Data 516 of data store 514 may comprise one or more of conventional tabular data, row-based data, column-based data, and object-based data. Moreover, the data may be indexed and/or selectively replicated in an index to allow fast searching and retrieval thereof. Data store 514 may support multi-tenancy to separately support multiple unrelated clients by providing multiple logical database systems which are programmatically isolated from one another.

Data store 514 may comprise any query-responsive data source or sources that are or become known, including but not limited to a structured-query language (SQL) relational database management system. Data store 514 may comprise a relational database, a multi-dimensional database, an eXtendable Markup Language (XML) document, or any other data storage system storing structured and/or unstructured data. The data of data store 514 may be distributed among several relational databases, dimensional databases, and/or other data sources. Embodiments are not limited to any number or types of data sources.

Data store 514 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Data visualization application 512 may be separated from or closely integrated with data store 514. Data visualization application 512 may be executed completely on a database platform of data store 514, without the need for an additional server. Architecture 500 may be implemented using any client-server architecture that is or becomes known, including but not limited to on-premise, cloud-based and hybrid architectures.

Client application 522 may comprise program code of an application for presenting user interfaces to allow interaction with server 510. According to some embodiments, client application 522 is a Web application provided by data visualization application 512 and executing within an execution engine of a Web browser.

Figure 6:
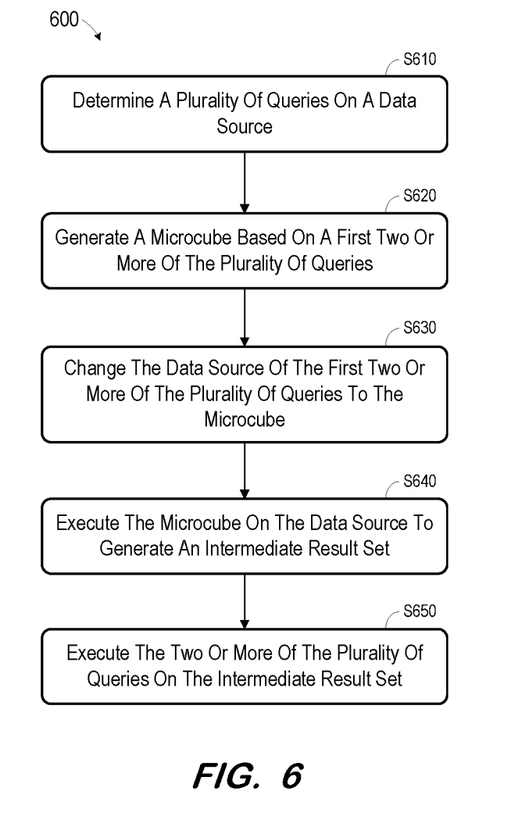
FIG. 6 is a flow diagram of a process to execute multiple queries using a microcube according to some embodiments.

FIG. 6 comprises a flow diagram of process 600 according to some embodiments. In some embodiments, various hardware elements of system 500 execute program code to perform process 600. Process 600 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a plurality of queries on a data source are acquired at S610. The plurality of queries may be generated by any system that is or becomes known. For example, the plurality of queries may comprise queries needed to render a set of data visualizations. Such a set of queries may be previously-persisted and retrieved at S610. In another example of S610, a user manipulates a user interface of a reporting tool to create queries based on dimensions, measures and/or filters and the queries are collected for batch execution until it is determined to execute the query. The determination may be based on a timer or a user interface event, for example.

A microcube is generated at S620 based on at least two or more of the determined plurality of queries. Generally, the microcube is generated based at least in part on commonalities between the two or more queries. Generation of a microcube at S620 may comprise execution of a clustering algorithm, with each determined cluster of queries representing a microcube.

In some embodiments, and as described with respect to FIG. 4C, S620 results in generation of more than one microcube, with each generated microcube being based on different sets of two or more queries. It may be determined at S620 that no microcubes should be generated based on the plurality of queries, in which case process 600 exits and the plurality of queries are executed in a known usual manner. A detailed example of microcube generation at S620 according to some embodiments will be described below in conjunction with FIGS. 7 and 8A through 8D Next, at S630, the data source of the first two or more of the plurality of queries is changed to the generated microcube. For example, with respect to FIG. 1, the data source of each of queries 210 through 230 was originally specified as view 250 (e.g., View001, view type). At S630, and as illustrated in FIG. 2, the data source of each of queries 210 through 230 is changed to microcube 300 (e.g., MicrocubeA, query type).

In a case that more than one microcube is generated at S620, the queries associated with each microcube are modified at S630 to change their data source to their associated microcube. It should be noted that, after S620, one or more of the plurality of queries might not be associated with any microcube, as illustrated in FIG. 4B.

The microcube is executed on the data source at S640 to generate an intermediate result set. According to some embodiments, all microcubes generated at S620, all modified queries of the originally-determined plurality of queries, and all unmodified queries of the originally-determined plurality of queries are transmitted to a query server for execution at S640. The query server is implemented to execute the microcube, which, as described above, is simply a query, in order to generate an intermediate result set which can be used as a data source of a subsequently-executed query. The intermediate result set may be and/or stored in volatile memory persisted at S640.

If more than one microcube was generated at S620, then an intermediate result set is generated for each microcube at S640. S640 may also include execution of any unmodified queries of the originally-determined plurality of queries.

Next, at S650, the two or more queries modified at S630 are executed on the intermediate result set generated at S640. FIG. 2 illustrates S650 according to some embodiments, in which modified queries 210 through 230 are executed on intermediate result set 310. The results of the execution at S650 are then returned, along with query results associated with any unmodified queries.

Figure 7:
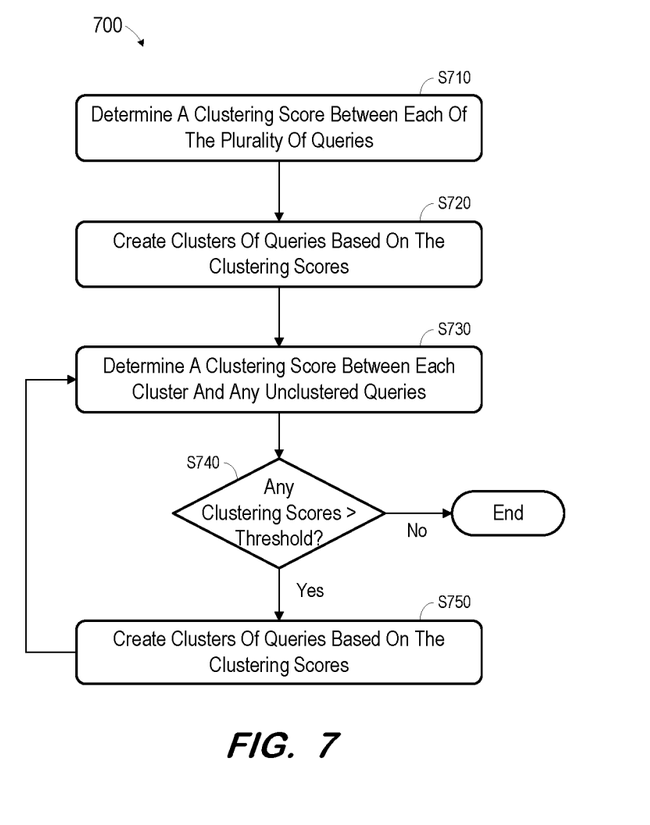
FIG. 7 is a flow diagram of a process to create a microcube according to some embodiments.
Figure 8A:
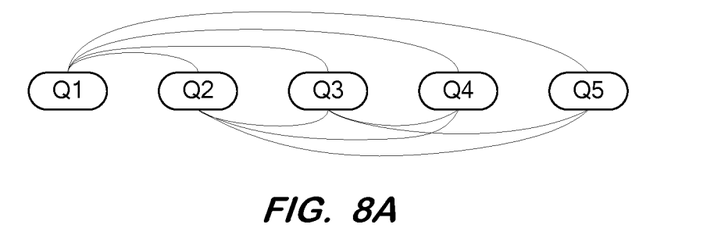
FIGS. 8A through 8D illustrate query clustering according to some embodiments.

Process 700 of FIG. 7 may be executed to generate microcubes at S620 based on a plurality of queries according to some embodiments. Initially, at S710, a clustering score is determined between each of the plurality of queries. FIG. 8 illustrates five queries Q1, Q2, Q3, Q4 and Q5. The lines connecting each of queries Q1, Q2, Q3, Q4 and Q5 represent the determination of clustering scores between each pair of queries.

Any scoring algorithm that is or becomes known may be employed at S710. For example, a clustering score between two queries may be determined based on a number of same and/or different dimensions, measures, and filters between the two queries. A scoring algorithm may consider the processing overhead associated with each dimension of the queries, the total number of dimensions, the total number of measures, etc. For example, a clustering score may increase if both queries include a same set of high-overhead dimensions, and may decrease if one query includes a high-overhead dimension which the other query does not include, and/or as the total number of dimensions or measures increases.

Clusters of queries are created at S720 based on the clustering scores. Cluster creation may be based on any algorithm or criteria which incorporates the previously-determined clustering scores. S720 may include creation of zero or more clusters. Process 700 exits if no clusters are created at S720.

In one example, two queries are clustered if their corresponding clustering score is greater than a threshold value. If, for example, the clustering score associated with queries Q1 and Q2 is above the threshold value and the clustering score associated with queries Q1 and Q3 is also above the threshold, but the clustering score associated with queries Q1 and Q3 is greater than the clustering score associated with queries Q1 and Q2, it may be determined to create a cluster including queries Q1 and Q3 at S720. More complex algorithms may allow for the clustering of three of more queries into a single cluster at S720.

Figure 8B:
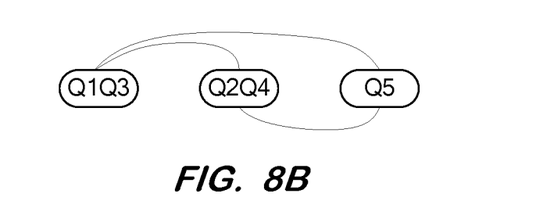

FIG. 8B depicts the FIG. 8A queries after clustering at S720 according to some embodiments. Queries Q1 and Q3 have been clustered into cluster Q1Q3, while Queries Q2 and Q4 have been clustered into cluster Q2Q4. Query Q5 is not associated with any cluster.

At S730, a clustering score is determined between each cluster and any unclustered queries. FIG. 8B also illustrates the determination of a clustering score between cluster Q1Q3 and cluster Q2Q4, between cluster Q1Q3 and query Q5, and between cluster Q2Q4 and query Q5. In the present example, it is then determined at S740 whether any of the clustering scores are greater than a threshold value. If not, flow terminates. If so, flow continues to S750 to create clusters of queries based on the clustering scores. and then returns to S730.

Figure 8C:
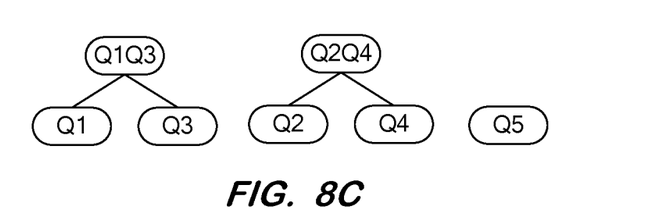
Figure 8D:
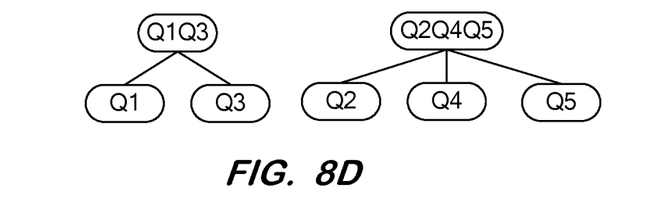

Flow therefore cycles between S730, S740 and S750 to attempt to combine existing clusters and/or unclustered queries, until no further clusters are created. FIGS. 8C and 8D illustrate two different clusterings which may result from the present example. At FIG. 8C, the FIG. 8B clusters are maintained, with queries Q1 and Q3 being modified to specify cluster (i.e., microcube) Q1Q3 as their data source, and with queries Q2 and Q4 being modified to specify cluster (i.e., microcube) Q2Q4 as their data source. Query Q5 remains unchanged.

As shown in FIG. 8D, it was determined at S750 to combine query Q5 with cluster Q2Q4 based on the clustering score determined therebetween at S730. Accordingly, queries Q1 and Q3 are modified to specify cluster Q1Q3 as their data source, and queries Q2, Q4 and Q5 are modified to specify cluster Q2Q4Q5 as their data source.

Figure 9:
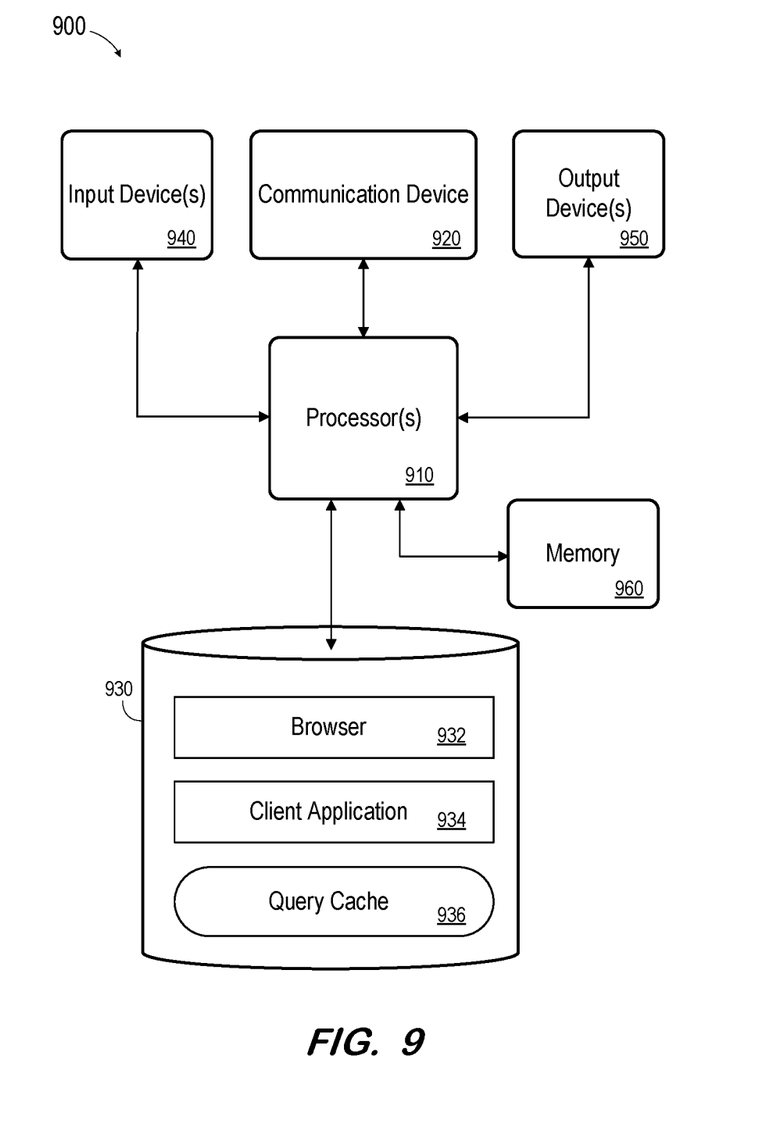
FIG. 9 is a block diagram of an apparatus according to some embodiments.

FIG. 9 is a block diagram of apparatus 900 according to some embodiments. Apparatus 900 may comprise a general-purpose computing apparatus and may execute program code to perform any of the functions described herein. Apparatus 900 may comprise an implementation of client system 520 as described above. Apparatus 900 may include other unshown elements according to some embodiments.

Apparatus 900 includes processor(s) 910 operatively coupled to communication device 920, data storage device 930, one or more input devices 940, one or more output devices 950 and memory 960. Communication device 920 may facilitate communication with external devices, such as a reporting client, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into apparatus 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 960 may comprise Random Access Memory (RAM), Storage Class Memory (SCM) or any other fast-access memory.

Browser 932 may comprise program code to provide an execution engine, while client application 934 may comprise program code executed by processor 910 (and within the execution engine) to cause apparatus 900 to perform any one or more of the processes described herein. Client application 934 may implement client application 522 described above. Embodiments are not limited to execution of the described processes by a single apparatus.

Query cache 936 may store queries until client application 934 determines to request execution of the queries. Prior to requesting execution, client application 934 may determine one or microcubes based on the queries and modify some or all of the queries to point to one of the generated microcubes, and then transmit the microcubes, the modified queries and any unmodified queries to a data server for execution. Data storage device 930 may also store data and other program code for providing additional functionality and/or which are necessary for operation of apparatus 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk drive, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a first computing system comprising:
a memory system storing processor-executable process steps; and
a processor to execute the processor-executable process steps to cause the first computing system to:
determine a plurality of queries, each of the plurality of queries indicating a first object as a data source;
generate a first query on the first object based on a first two or more of the plurality of queries, wherein the generation of the first query comprises applying a clustering algorithm that determines a clustering score associated with each pair of queries of the plurality of queries, the clustering score is based on: a processing overhead associated with each dimension of a plurality of dimensions of the each pair of queries, a total number of dimensions of the plurality of queries, and a total number of measures of the plurality of queries;
modify each of the first two or more queries to indicate the first query as the data source;
request execution of the first query and the modified first two or more queries; and
receive a result set associated with each of the first two or more queries.

2. A system according to claim 1, wherein requesting of execution of the first query and the modified first two or more queries comprises requesting execution of a second one or more of the plurality of queries other than the first two or more queries, and
wherein reception of a result set associated with each of the first two or more queries comprises reception of a result set associated with each of the second one or more of the plurality of queries.

3. A system according to claim 1, the processor to execute processor-executable process steps to cause the computing device to:
generate a second query on the first object based on a second two or more of the plurality of queries;
modify each of the second two or more queries to indicate the second query as the data source;
request execution of the second query and the modified second two or more queries; and
receive a result set associated with each of the second two or more queries.

4. A system according to claim 3, wherein requesting of execution of the first query and the modified first two or more queries comprises requesting execution of a third one or more of the plurality of queries other than the first two or more queries and the second two or more queries, and
wherein reception of a result set associated with each of the first two or more queries comprises reception of a result set associated with each of the third one or more of the plurality of queries.

5. A system according to claim 1, further comprising:
a second computing system comprising:
a second memory system storing second processor-executable process steps; and
a second processor to execute the second processor-executable process steps to cause the second computing system to:
receive the request for execution of the first query and the modified first two or more queries; and
in response to the request, execute the first query on the first object to generate an intermediate result set, and execute each of the modified first two or more queries on the intermediate result set to generate the result sets associated with each of the first two or more queries.

6. A method comprising:
determining a plurality of queries, each of the plurality of queries indicating a first object as a data source;
generating a first query on the first object based on a first two or more of the plurality of queries, wherein the generation of the first query comprises applying a clustering algorithm that determines a clustering score associated with each pair of queries of the plurality of queries, the clustering score is based on: a processing overhead associated with each dimension of a plurality of dimensions of the each pair of queries, a total number of dimensions of the plurality of queries, and a total number of measures of the plurality of queries;
modifying each of the first two or more queries to indicate the first query as the data source;
requesting execution of the first query and the modified first two or more queries; and
receiving a result set associated with each of the first two or more queries.

7. A method according to claim 6, wherein requesting of execution of the first query and the modified first two or more queries comprises requesting execution of a second one or more of the plurality of queries other than the first two or more queries, and
wherein receiving a result set associated with each of the first two or more queries comprises receiving a result set associated with each of the second one or more of the plurality of queries.

8. A method according to claim 6, further comprising:
generating a second query on the first object based on a second two or more of the plurality of queries;
modifying each of the second two or more queries to indicate the second query as the data source;
requesting execution of the second query and the modified second two or more queries; and
receiving a result set associated with each of the second two or more queries.

9. A method according to claim 8, wherein requesting execution of the first query and the modified first two or more queries comprises requesting execution of a third one or more of the plurality of queries other than the first two or more queries and the second two or more queries, and
wherein receiving a result set associated with each of the first two or more queries comprises receiving a result set associated with each of the third one or more of the plurality of queries.

10. A method according to claim 6, further comprising:
receiving the request for execution of the first query and the modified first two or more queries; and
in response to the request, executing the first query on the first object to generate an intermediate result set, and executing each of the modified first two or more queries on the intermediate result set to generate the result sets associated with each of the first two or more queries.

11. A computer-readable medium storing processor-executable process steps that when executed by a computing system cause the computing system to:
determine a plurality of queries, each of the plurality of queries indicating a first object as a data source;
generate a first query on the first object based on a first two or more of the plurality of queries, wherein the generation of the first query comprises applying a clustering algorithm that determines a clustering score associated with each pair of queries of the plurality of queries, the clustering score is based on: a processing overhead associated with each dimension of a plurality of dimensions of the each pair of queries, a total number of dimensions of the plurality of queries, and a total number of measures of the plurality of queries;
modify each of the first two or more queries to indicate the first query as the data source;
request execution of the first query and the modified first two or more queries; and
receive a result set associated with each of the first two or more queries.

12. A medium according to claim 11, wherein requesting of execution of the first query and the modified first two or more queries comprises requesting of execution of a second one or more of the plurality of queries other than the first two or more queries, and
wherein receiving a result set associated with each of the first two or more queries comprises receiving a result set associated with each of the second one or more of the plurality of queries.

13. A medium according to claim 11, further comprising processor-executable process steps that when executed by a computing system cause the computing system to:
generate a second query on the first object based on a second two or more of the plurality of queries;
modify each of the second two or more queries to indicate the second query as the data source;
request execution of the second query and the modified second two or more queries; and
receive a result set associated with each of the second two or more queries.

14. A medium according to claim 13, wherein requesting of execution of the first query and the modified first two or more queries comprises requesting of execution of a third one or more of the plurality of queries other than the first two or more queries and the second two or more queries, and wherein reception of a result set associated with each of the first two or more queries comprises reception of a result set associated with each of the third one or more of the plurality of queries.

15. A medium according to claim 11, further comprising processor-executable process steps that when executed by a computing system cause the computing system to:
   receive the request for execution of the first query and the modified first two or more queries; and
   in response to the request, execute the first query on the first object to generate an intermediate result set, and execute each of the modified first two or more queries on the intermediate result set to generate the result sets associated with each of the first two or more queries.

16. A system according to claim 1, the processor to execute processor-executable process steps to cause the computing device to:
   compare the clustering score to a threshold value; and
   in a case that the clustering score satisfies a threshold value, generate the first query on the first object.

17. A method according to claim 6, further comprising:
   comparing the clustering score to a threshold value; and
   in a case that the clustering score satisfies a threshold value, generating the first query on the first object.

18. A medium according to claim 11, further comprising processor-executable process steps that when executed by a computing system cause the computing system to:
   compare the clustering score to a threshold value; and
   in a case that the clustering score satisfies a threshold value, generate the first query on the first object.

* * * * *